United States Patent
Cheng et al.

(10) Patent No.: US 6,893,166 B2
(45) Date of Patent: May 17, 2005

(54) FACTORY-SETTABLE OPTICAL SUBASSEMBLY USED IN AN OPTICAL TRANSCEIVER MODULE

(75) Inventors: Yung Chang Cheng, Tu-Chen (TW); Chung Hsiin Mou, Tu-Chen (TW); Nan Tsung Huang, Tu-Chen (TW); Jung Yuan Lee, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 110 days.

(21) Appl. No.: 10/625,814

(22) Filed: Jul. 22, 2003

(65) Prior Publication Data
US 2004/0240799 A1 Dec. 2, 2004

(30) Foreign Application Priority Data
Feb. 14, 2003 (TW) .................................. 92202373 U

(51) Int. Cl.⁷ ................................................ G02B 6/36
(52) U.S. Cl. ........................................... 385/88; 385/93
(58) Field of Search ..................................... 385/88–94

(56) References Cited

U.S. PATENT DOCUMENTS 5,631,991 A * 5/1997 Cohen et al. ................. 385/93
6,302,596 B1 * 10/2001 Cohen et al. ................. 385/93

* cited by examiner

Primary Examiner—Phan T. H. Palmer
(74) Attorney, Agent, or Firm—Wei Te Chung

(57) ABSTRACT

A factory-settable optical subassembly (10) used in an optical transceiver module includes an optoelectronic converter (20), a top can (30), and a positioning element (40). The optoelectronic converter includes a housing (24) having an opening (243) for passage of light and a lens (211) for focusing light. The top can has a first through hole (34) and a coaxial second through hole (35) in communication with each other. The positioning element has a third through hole (41) and can be moved linearly to a desired position within the second through hole, where it is permanently fixed. An optical ferrule (50) can then be inserted through the first through hole and into the second through hole until it abuts the positioning element. An end of the optical ferrule is thereby located at a focal position for a selected wavelength of light emanated from the optoelectronic converter, given the characteristics of the lens.

17 Claims, 6 Drawing Sheets

FACTORY-SETTABLE OPTICAL SUBASSEMBLY USED IN AN OPTICAL TRANSCEIVER MODULE

BACKGROUND OF THE INVENTION

1. Field of the Invention

This invention generally relates to an optical subassembly, and more particularly to a factory-settable optical subassembly used in an optical transceiver module.

2. Prior Art

The efficiency of an optoelectronic converter in an optical transceiver module is one of the most important factors in optical transmission systems. It depends on both the efficiency of a laser diode receiving light from an optical fiber and a laser device transmitting light into the optical fiber.

A conventional optical subassembly of a transceiver module usually comprises a metal top can, a metal base cover, and a laser device. The top can attaches to the base cover to enclose the laser device. The top can comprises a locating means for positioning a ferrule of an optical connector inserted therein, and the laser device comprises a lens to focus light on an end surface of the ferrule. However, each top can of the conventional optical subassembly can only efficiently focus one wavelength of light, since the top can fixes only one distance between the lens and an end of the ferrule. This distance and the lens characteristics determine which wavelength will be efficiently transmitted. Other will not focus. Therefore, different top cans will be needed to transmit different wavelengths of light into the end surface of the ferrule. Manufacturing such a plurality of different top cans having different dimensions would be expensive.

In order to solve the above mentioned problems, US. Pat. No. 5,631,991 discloses an improved optical subassembly. The optical subassembly comprises a cover, a laser means, and a lens. The cover has a top section and a bottom section in communication therewith. The top section comprises a fastener for securing a ferrule inserted therein and the bottom section receives the laser means and the lens. The lens can move in the bottom section along a direction of an axis of the cover. When different wavelengths of light are transmitted from the laser means to the optical fiber, the distance between the lens and the end surface of the ferrule can be adjusted by positioning the lens at an appropriate position so that light can properly focus on the end surface of the ferrule. Maximum optical power is thus obtained. However, the lens is susceptible to being damaged or optical characteristics of the lens are susceptible to being degraded during such an adjustment due to improper manipulation, which in turn can lead to decrease optical efficiency.

SUMMARY OF THE INVENTION

Accordingly, an object of the present invention is to provide a factory-settable optical subassembly, which can be selectively adjusted during manufacture to transmit one desired wavelength of laser light most efficiently to an associated optical fiber.

To achieve the above-mentioned object, a factory-settable optical subassembly used in an optical transceiver module according to the present invention includes an optoelectronic converter, a top can, and a positioning element. The optoelectronic converter includes a laser transmitting one preselected wavelength of light, a housing having an opening for passage of the light therethrough and a lens for focusing the light. The top can has a first through hole and a coaxial second through hole in communication with each other. The first through hole is for receiving a ferrule-held optical fiber and the second through hole is for receiving the positioning element. The positioning element can be moved along the axis of the second through hole and is then permanently fixed at an appropriate position to stop insertion of the ferrule-held optical fiber where a maximum of the laser light focuses on an end surface of the ferrule. Therefore, the one selected wavelength of light is efficiently transmitted through the optical subassembly since the positioning element in the second through hole properly fixes the distance between the lens and the end surface of the ferrule.

Other objects, advantages and novel features of the present invention will be drawn from the following detailed description of preferred embodiments of the present invention.

DETAILED DESCRIPTION OF THE INVENTION

Figure 1:
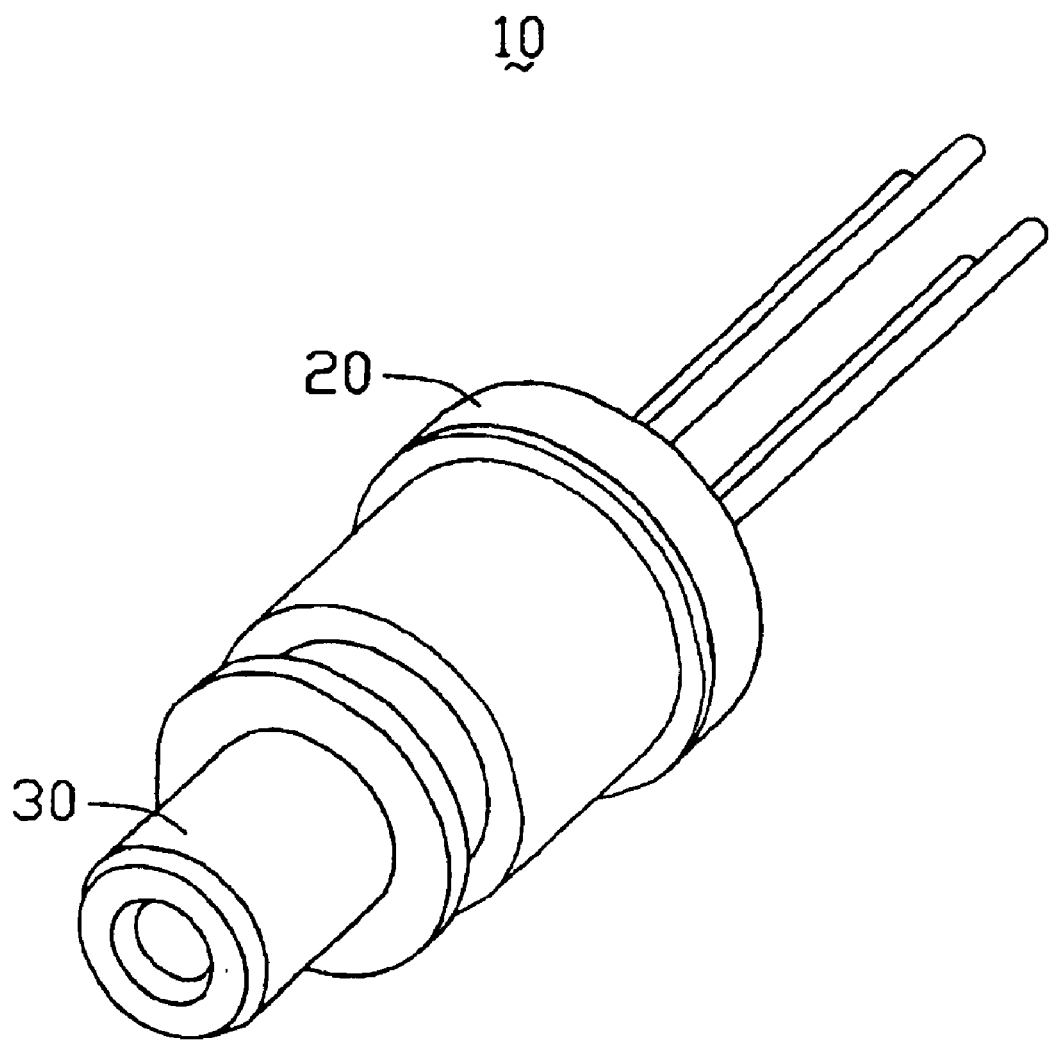
FIG. 1 is a perspective view of a factory-settable optical subassembly of the present invention.
Figure 2:
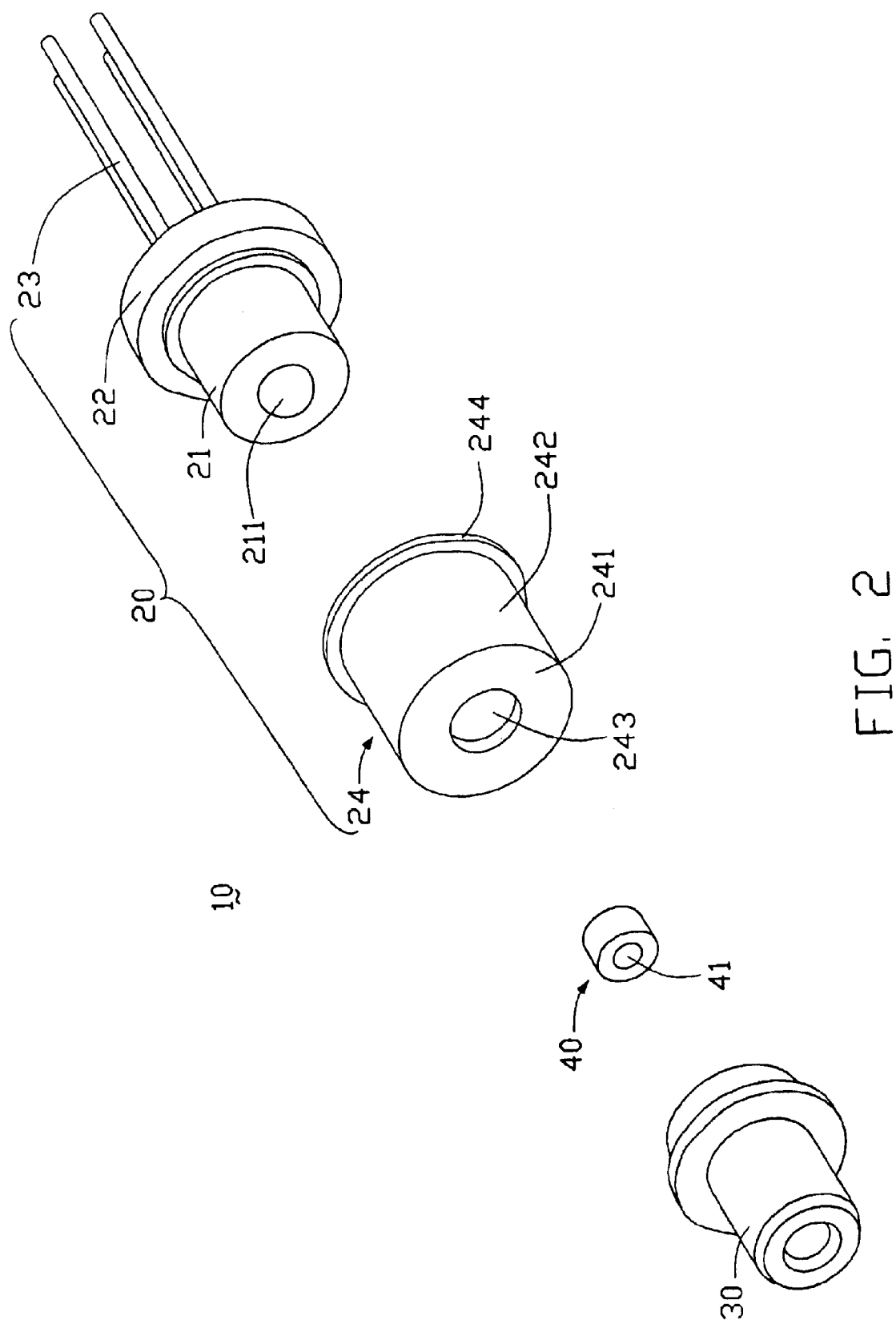
FIG. 2 is an exploded, perspective view of a factory-settable optical subassembly according to a first preferred embodiment of the present invention.

Referring to FIG. 1 and FIG. 2, a factory-settable optical subassembly 10 of the present invention for use in an optical transceiver module (not shown), comprises an optoelectronic converter 20, a top can 30, and a positioning element 40. The optoelectronic converter 20 is attached to the top can 30 by welding to enclose the positioning element 40.

The optoelectronic converter 20 comprises an emitting portion 21, a base 22, a plurality of conductive posts 23, and a housing 24. Both the emitting portion 21 and the base 22 are cylindrical. The emitting portion 21 is attached to the base 22. The emitting portion 21 contains a laser (not shown) therein and a lens 211 engaged in an end surface thereof for focusing light from the laser. The plurality of conductive posts 23 connects to the laser and extends through the base 22 for mounting on a printed circuit board (not shown). The housing 24 is also in a cylindrical shape. The housing 24 comprises an annular flange 244, an annular sidewall 242 extending therefrom, and an end panel 241 having an opening 243 for allowing light to pass through from the lens 211. The annular flange 244 is secured to the base 22 by welding to enclose the emitting portion 21.

Figure 3:
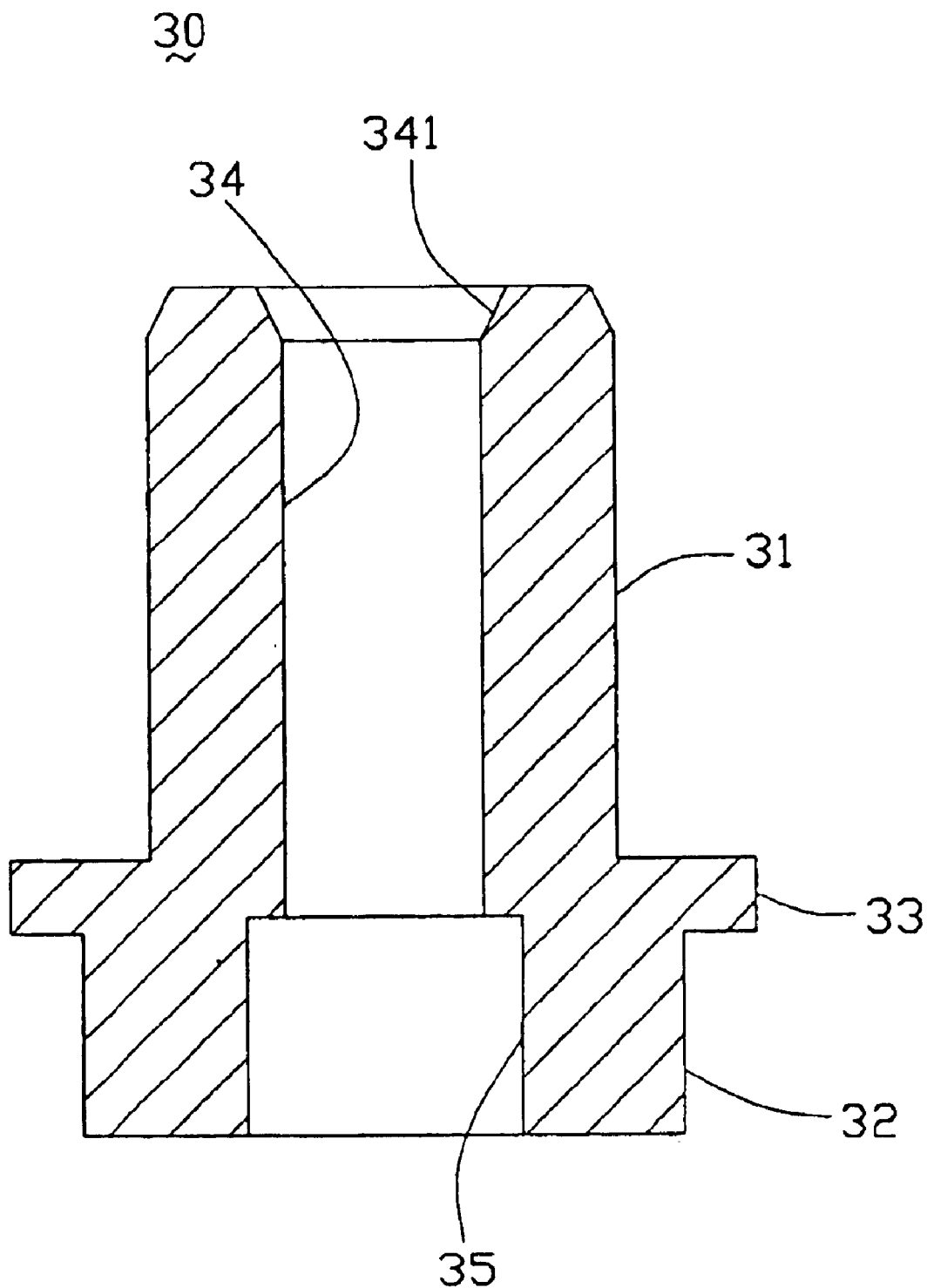
FIG. 3 is a cross-sectional view of a top can of the factory-settable optical subassembly of FIG. 2.

Referring to FIG. 3 in conjunction with FIG. 2, the top can 30 of a first embodiment of the present invention comprises a first cylinder 31, a second cylinder 32, and an annular platform 33 formed therebetween. The platform 33 is for engaging with the optical transceiver module (not shown). A diameter of the first cylinder 31 is smaller than that of the second cylinder 32. The first cylinder 31 defines a first through hole 34 for receiving a ferrule 50 of an optical fiber (referring to FIG. 4). The first through hole 34 defines a chamfer 341 at an entrance thereof on an inner sidewall (not labeled) for guiding the ferrule 50 into the first through hole 34. The second cylinder 32 defines a second through hole 35 for receiving the positioning element 40, and the second through hole 35 is in communication with the first through hole 34. A diameter of the second through hole 35 is bigger than a diameter of the first through hole 34. The second through hole 35 is in communication with the opening 243 of the housing 24, when the top can 30 is attached to the housing 24.

The positioning element 40 has a shape corresponding to the second through hole 35 and has an outside diameter slightly smaller than an interior diameter of the second through hole 35. The positioning element 40 is slidingly received in the second through hole 35, and can be moved linearly along an axis thereof The positioning element 40 has a third through hole 41 which is coaxial with the first through hole 34 and the second through hole 35. An interior diameter of the third through hole 41 is smaller than an outside diameter of the ferrule 50.

Figure 4:
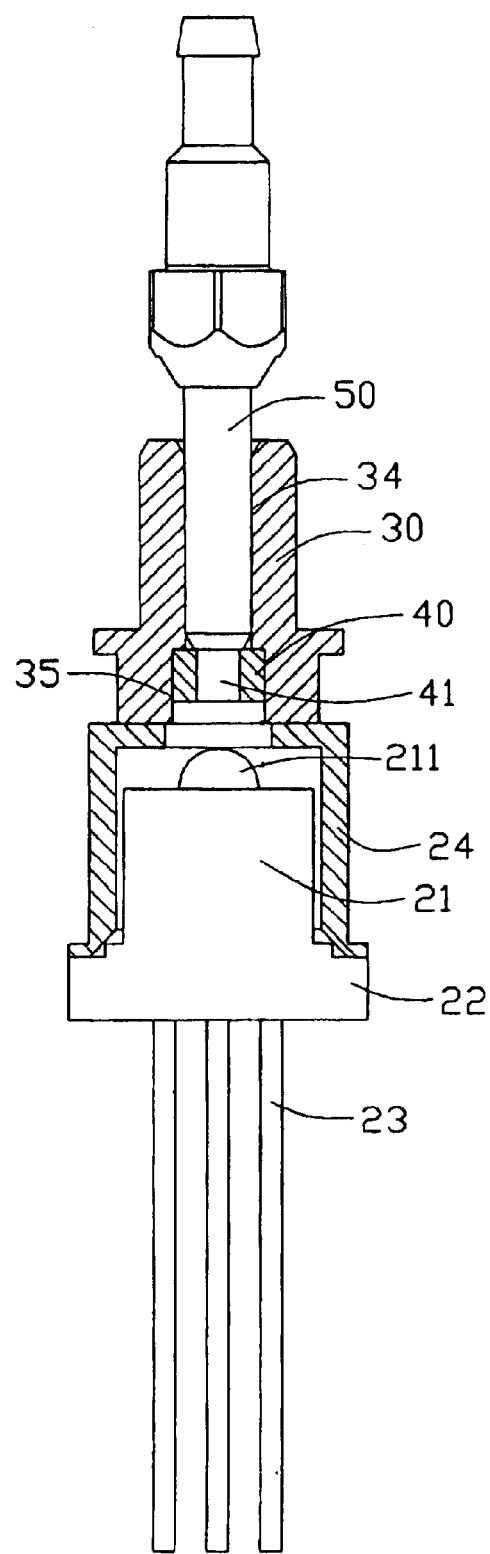
FIG. 4 is a partially cross-sectional view of the assembled factory-settable optical subassembly of FIG. 2 with a mating ferrule.

Referring to FIG. 4, during assembly of the factory-settable optical subassembly 10, the emitting portion 21 is first enclosed within the housing 24 by welding the base 22 to the annular flange 244 of the housing 24. Then, the positioning element 40 is slideably received in the second through hole 35 and is moved to a position in the second through hole 35 calculated to stop insertion of the ferrule 50 at the proper distance to focus the selected wavelength of light produced by the laser and propagated through the lens 211 on an end of the optical fiber. Then the positioning element 40 is secured by welding or adhesive and the top can 30 is secured to the end panel 241 of the housing 24 by welding. Finally, the ferrule 50 is inserted through the first through hole 34 and into the second through hole 35 of the top can 30 with the end surface (not labeled) of the ferrule 50 abutting against an end of the positioning element 40. Hence, the ferrule 50 is at a position where a maximum of light focuses on the end surface of the optical fiber in the ferrule 50.

Figure 5:
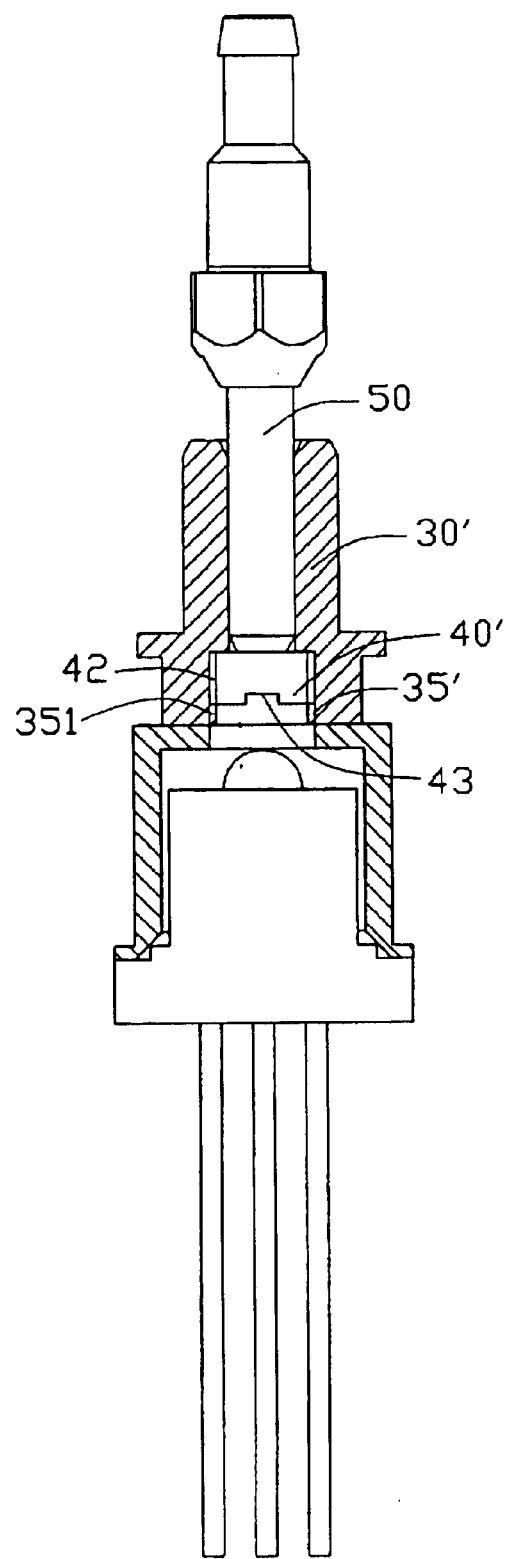
FIG. 5 is a partially cross-sectional view of a factory-settable optical subassembly according to a second embodiment of the present invention with a mating ferrule.
Figure 6:
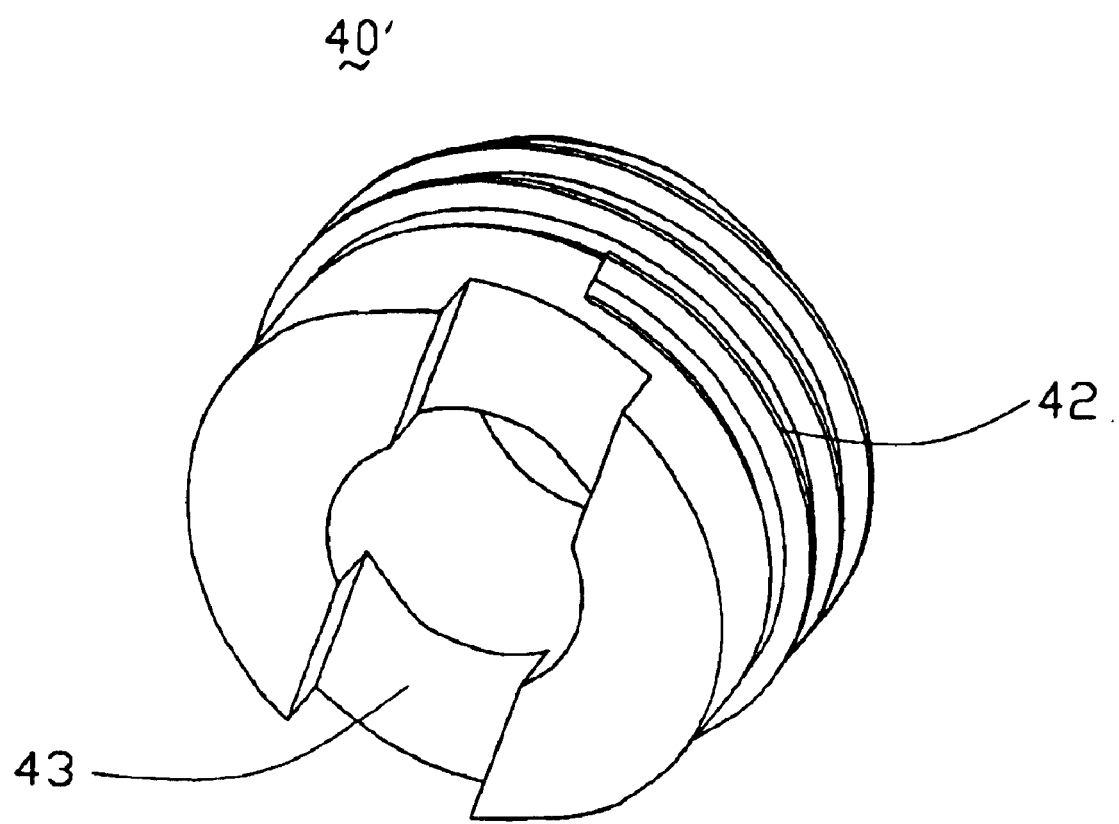
FIG. 6 is a perspective view of a positioning element of the factory-settable optical subassembly of the second embodiment of the present invention.

Referring to FIG. 5 and FIG. 6, to improve control when positioning the positioning element 40 precisely in the top can 30, a top can 30' of a second embodiment defines threads 351 on an inner wall of a second through hole 35' thereof, and a positioning element 40' defines complementary threads 42 on an outside wall thereof. A recess 43 is formed at a bottom (not labeled) of the positioning element 40'. When the optical subassembly is being manufactured, the required position of the positioning element 40' is firstly determined according to a wavelength of light to be transmitted therethrough and the optical characteristics of the lens 211. A tool (not shown) is then inserted into the recess 43 to rotate the positioning element 40' in the second through hole 35' to move to the determined position which will result in a maximum of light being focused on an end surface of the ferrule. Finally, the positioning element 40' is secured by welding or adhesive. The top can 30' is then secured to the end panel 241 of the housing 24 by welding. When the ferrule 50 is inserted into the top can 30' with the ferrule 50 abutting the positioning element 40', the end of the ferrule 50 will be at a proper distance so that the wavelength of light will be focused thereon.

Since the distance between the end surface of the ferrule 50 and the lens 211 can be conveniently and precisely adjusted to accommodate a desired wavelength of light and the optical characteristics of the lens 211, there is no need to design or manufacture other top cans having different lengths to accommodate different focal requirements of different wavelengths of light. Moreover, potential damage to the lens is avoided since the focus is determined by adjusting the positioning element 40, instead of adjusting the lens 211.

It is believed that the present invention and its advantages will be understood from the foregoing description and it will be apparent that various changes may be made thereto without departing from the spirit and scope of the invention or sacrificing all of its material advantages, the examples hereinbefore described merely being preferred or exemplary embodiments of the invention.

What is claimed is:

1. A factory-settable optical subassembly for receiving a ferrule-held optical fiber, for use in an optical transceiver module, comprising:

an optoelectronic converter having an opening for passage of light;

a top can element attachable to the optoelectronic converter and having a first through hole and a second through hole, the first through hole and the second through hole being in communication with each other; and a positioning element having a third through hole and the positioning element being received in the second through hole;

wherein the first through hole, the second through hole, the third through hole and the opening of the optoelectronic converter are arranged coaxially, and the positioning element can be moved along the axis of the second through hole and fixed in position such that, when the ferrule-held optical fiber is received through the first through hole and abuts against the positioning element, an end of the optical fiber will be at a proper focal distance from the optoelectronic converter to transmit a desired wavelength of light emitted by the optoelectronic converter at a maximum efficiency.

2. The optical subassembly of claim 1, wherein the positioning element is in a cylindrical shape.

3. The optical subassembly of claim 2, wherein interior threads are defined on an inside wall of the second through hole, and complementary threads are defined on an outside wall of the positioning element.

4. The optical subassembly of claim 3, wherein a recess is defined at a bottom of the positioning element.

5. The optical subassembly of claim 1, wherein the optoelectronic converter comprises a laser device, a base, a plurality of conductive wire, and a housing, the laser device is secured with the base and the housing receives the laser device and lens.

6. The optical subassembly of claim 5, wherein the opening of the optoelectronic converter is defined through the housing.

7. The optical subassembly of claim 1, wherein the top can element further comprises a platform for engaging with an optical transceiver module.

8. The optical subassembly of claim 1, wherein an interior diameter of the second through hole is bigger than that of the first through hole.

9. A factory-settable optical subassembly for use in an optical transceiver module, for coupling with a ferrule-held optical fiber, comprising:

an optoelectronic converter having a lens received therein for focusing light on an end portion of the optical fiber, and an opening for passage of light;

a top can element the attachable to the optoelectronic converter and defining at least a first through hole;

a positioning element defining a second through hole; and wherein the positioning element is received in the first through hole of the top can element, and the ferrule-held optical fiber is inserted into the first through hole to abut against the positioning element such that the optical fiber, the first through hole of the top can element, the second through hole of the positioning element, and the opening of the optoelectronic converter are coaxial with the lens, and the positioning element is moved linearly in the first through hole to a desired position and is then secured therein, a distance between an end face of the optical fiber and the lens is such that a desired wavelength of light emitted by the optoelectronic converter is coupled into the optical fiber with maximum efficiency.

10. The optical subassembly of claim 9, wherein the optoelectronic converter additionally comprises a laser device, a base, a plurality of conductive wires and a housing, the laser device is secured with the base and the housing receives the laser device.

11. The optical subassembly of claim 10, wherein the opening of the optoelectronic converter is defined through the housing.

12. The optical subassembly of claim 9, wherein the top can element further comprises a flange for engaging with an optical transmitter module.

13. The optical subassembly of claim 9, further comprises the interior threads are defined on an inside wall of the first through hole and complementary threads are defined on an outside wall of the positioning element.

14. The optical subassembly of claim 13, wherein the interior threads engage with the complementary threads.

15. The optical subassembly of claim 9, wherein the positioning element is in a cylindrical shape.

16. The optical subassembly of claim 9, further comprises a recess is defined at a bottom of the positioning element.

17. An optical assembly comprising:

an optoelectronic converter having an opening for passage of light;

a top can element attached to the converter;

a positioning element initially moveable along an axial direction in the top can, and successively secured to the top can after achieving a proper axial position thereof; and a ferrule-held optical fiber element including an end face abutting against one side of the positioning element and a cylindrical body snugly received in the top can; wherein said positioning element defines a through hole to communicate said ferrule-held optical fiber element, along said axial direction, to said passage which is located on the other side of said positioning element.

* * * * *